(12) United States Patent
Xu et al.

(10) Patent No.: US 12,139,664 B2
(45) Date of Patent: Nov. 12, 2024

(54) THERMAL STIMULI-RESPONSIVE SURFACTANTS FOR ENHANCED OIL RECOVERY

(71) Applicant: Saudi Arabian Oil Company, Dhahran (SA)

(72) Inventors: Limin Xu, Beijing (CN); Ming Han, Dhahran (SA); Tianping Huang, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/117,171

(22) Filed: Mar. 3, 2023

(65) Prior Publication Data
US 2024/0294822 A1 Sep. 5, 2024

(51) Int. Cl.
*E21B 43/34* (2006.01)
*C09K 8/584* (2006.01)

(52) U.S. Cl.
CPC .................................. *C09K 8/584* (2013.01)

(58) Field of Classification Search
CPC ................................ C09K 8/584; E21B 43/34
USPC ....................................................... 166/305.1
See application file for complete search history.

(56) References Cited

U.S. PATENT DOCUMENTS

| 4,799,547 A * | 1/1989 | Borchardt ............. E21B 43/164 166/275 |
| 5,441,541 A | 8/1995 | Mehreteab et al. |
| 5,979,557 A | 11/1999 | Card et al. |
| 6,306,800 B1 | 10/2001 | Samuel et al. |
| 6,410,489 B1 | 6/2002 | Zhang et al. |
| 6,637,517 B2 | 10/2003 | Samuel et al. |
| 7,008,908 B2 | 3/2006 | Chan et al. |
| 7,237,608 B2 | 7/2007 | Fu et al. |
| 7,458,424 B2 | 12/2008 | Odeh et al. |
| 7,533,723 B2 | 5/2009 | Hughes et al. |
| 7,621,334 B2 | 11/2009 | Welton et al. |
| 7,858,563 B2 | 12/2010 | Hughes et al. |
| 7,875,575 B2 | 1/2011 | Huang et al. |
| 7,989,404 B2 | 8/2011 | Kakadjian et al. |
| 8,053,397 B2 | 11/2011 | Huang et al. |
| 9,670,397 B2 | 6/2017 | Ghumare et al. |
| 9,828,815 B2 * | 11/2017 | Silveira ..................... C09K 8/94 |
| 10,266,748 B2 | 4/2019 | Kalgaonkar et al. |

(Continued)

FOREIGN PATENT DOCUMENTS

| CA | 2959311 | 9/2019 |
| CN | 103540305 | 1/2014 |

(Continued)

OTHER PUBLICATIONS

Brown et al., "Stimuli-Responsive Surfactants," Soft Matter, Jan. 23, 2013, 8:2365-74, 11 pages.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

This disclosure relates to thermal stimuli-responsive surfactant mixtures useful for reducing water/oil interfacial tension at high temperatures and increasing water/oil interfacial tension at low temperatures. The disclosure also relates to methods of using the surfactant mixtures for enhanced oil recovery applications.

15 Claims, 1 Drawing Sheet

(56) References Cited

U.S. PATENT DOCUMENTS

| | | | |
|---|---|---|---|
| 10,351,755 | B2 | 7/2019 | Wagle et al. |
| 10,407,609 | B2 | 9/2019 | Kalgaonkar et al. |
| 10,494,565 | B2 | 12/2019 | Wylde et al. |
| 10,995,261 | B2 | 5/2021 | Holtsclaw et al. |
| 11,203,712 | B1 | 12/2021 | Kalgaonkar et al. |
| 11,254,855 | B2 * | 2/2022 | Xu .................... E21B 43/16 |
| 11,685,855 | B2 | 6/2023 | Kalgaonkar et al. |
| 2008/0311060 | A1 | 12/2008 | Sakuta et al. |
| 2011/0071056 | A1 | 3/2011 | Saini et al. |
| 2012/0085534 | A1 | 4/2012 | Morvan |
| 2013/0261033 | A1 | 10/2013 | Nguyen |
| 2015/0267104 | A1 * | 9/2015 | Puerto .................... C09K 8/584 166/305.1 |
| 2016/0024370 | A1 | 1/2016 | Ba geri |
| 2016/0024891 | A1 | 1/2016 | Fursdon-Welsh et al. |
| 2019/0256458 | A1 * | 8/2019 | Hussain ................ C07C 233/38 |
| 2019/0284467 | A1 | 9/2019 | Forbes et al. |
| 2021/0147744 | A1 | 5/2021 | Xu |
| 2021/0332307 | A1 | 10/2021 | Huff et al. |
| 2021/0380867 | A1 | 12/2021 | Kalgaonkar et al. |
| 2021/0380871 | A1 | 12/2021 | Kalgaonkar et al. |
| 2022/0298408 | A1 | 9/2022 | Nguyen et al. |
| 2023/0265334 | A1 | 8/2023 | Kalgaonkar et al. |

FOREIGN PATENT DOCUMENTS

| | | |
|---|---|---|
| CN | 201210239959 | 1/2014 |
| CN | 103540304 | 2/2017 |
| CN | 104232045 | 2/2017 |
| CN | 114196388 | 3/2022 |
| WO | WO 2020086309 | 4/2020 |

OTHER PUBLICATIONS

Guo et al., "Temperature-Resistant and Salt-Tolerant Mixed Surfactant System for EOR in the Tahe Oilfield," Petroleum Science, Jul. 21, 2020, 18:667-78, 12 pages.

He et al., "Unique Mixtures of Anionic/Cationic Surfactants: A New Approach to Enhance Surfactant Performance in Liquids-Rich Shale Reservoirs," SPE Production & Operations, May 14, 2018, 33(02):363-70, 8 pages.

Jia et al., "Systematic Investigation of the Effects of Mixed Cationic/Anionic Surfactants on the Interfacial Tension of a Water/Model Oil System and their Application to Enhance Crude Oil Recovery," Colloids and Surfaces A: Physicochemical and Engineering Aspects, Sep. 20, 2017, 529:621-7, 7 pages.

Li et al., "Mixtures of Anionic/Cationic Surfactants: A New Approach for Enhanced Oil Recovery in Low-Salinity, High-Temperature Sandstone Reservoir," SPE Journal, Aug. 15, 2016, 21(04):1164-77, 14 pages.

Wazir et al., "New Formulation of Ultra-Low Ift Surfactant for Potential Eor Application," presented at the Offshore Technology Conference Asia, Kuala Lumpur, Malaysia, Mar. 22-25, 2022, 17 pages.

Wu et al., "Study of New Type of Temperature-Resistant and Salt-Tolerant Surfactant for Polymer/Surfactant Two-Component Flooding System," presented at the 2010 Asia-Pacific Power and Energy Engineering Conference, Chengdu, China, Mar. 28, 2010, 4 pages.

Chu et al., "A facile route towards the preparation of ultra-long-chain amidosulfobetaine surfactants," Synlett, 2009, 16:2655-2658, 4 pages.

Howard et al., "Comparison of Flowback Aids: Understanding Their Capillary Pressure and Wetting Properties," presented at the SPE European Formation Damage Conference, Lafayette, Louisiana, May 27, 2009, 12 pages.

Liang et al., "Identifying and Evaluating Surfactant Additives to Reduce Water Blocks After Hydraulic Fracturing for Low Permeability Reservoirs," presented at the SPE Improved Oil Recovery Conference, Tulsa, Oklahoma, Apr. 11, 2016, 19 pages.

Mahmoudkhani et al., "Microemulsions as Flowback Aids for Enhanced Oil and Gas Recovery After Fracturing, Myth or Reality: A Turnkey Study to Determine the Features and Benefits," presented at the SPE International Symposium on Oilfield Chemistry, Woodlands, Texas, Apr. 13-15, 2015, 21 pages.

Rabie et al., "Evaluation of a New Environmentally Friendly Flowback Surfactant and Its Application to Enhance Oil and Gas Productivity," presented at the SPE Middle East Oil and Gas Show and Conference, Manama, Bahrain, Mar. 18-21, 2019, 15 pages.

Rabie et al., "New Insights in the Characteristics Required for a Successful Flowback Surfactant and Its Use in Tight and Unconventional Reservoirs," presented at the International Petroleum Technology Conference, Beijing, China, Mar. 22, 2019, 16 pages.

Shuler et al., "Surfactant Huff-n-Puff Application Potentials for Unconventional Reservoirs," presented at the Improved Oil Recovery Conference, Tulsa, Oklahoma, Apr. 11-13, 2016, 14 pages.

Yue et al., "Multifunctional Fracturing Additives as Flowback Aids," presented at the SPE Annual Technical Conference and Exhibition, Sep. 26-28, 2016, Dubai, UAE, 12 pages.

Zhang et al., "Unique Flow-Back Chemistry for Enhancing Productivity of Low-Permeability Reservoir," presented at the IADC/SPE Asia Pacific Drilling Technology Conference and Exhibition, Tianjin, China, Jul. 9, 2012, 8 pages.

TopSilicone.com [online], "Silicone Adjuvant for Agriculture TPD," retrieved on Jan. 17, 2023, retrieved from URL <https://www.topsilicone.com/product/silicone-agricultual-adjuvant-tpd-348>; 6 pages.

Acharya et al., "Effect of temperature on the rheology of wormlike micelles in a mixed surfactant system," Journal of Colloid and Interface Science, Jul. 2007, 315:330-336, 7 pages.

Liu et al., "Comprehensive review on surfactant adsorption on mineral surfaces in chemical enhanced oil recovery," Advances in Colloid and Interface Science, Aug. 2021, 294: 102467, 23 pages.

International Search Report and Written Opinion in International Appln No. PCT/US2024/017469, dated May 27, 2024, 18 pages.

* cited by examiner

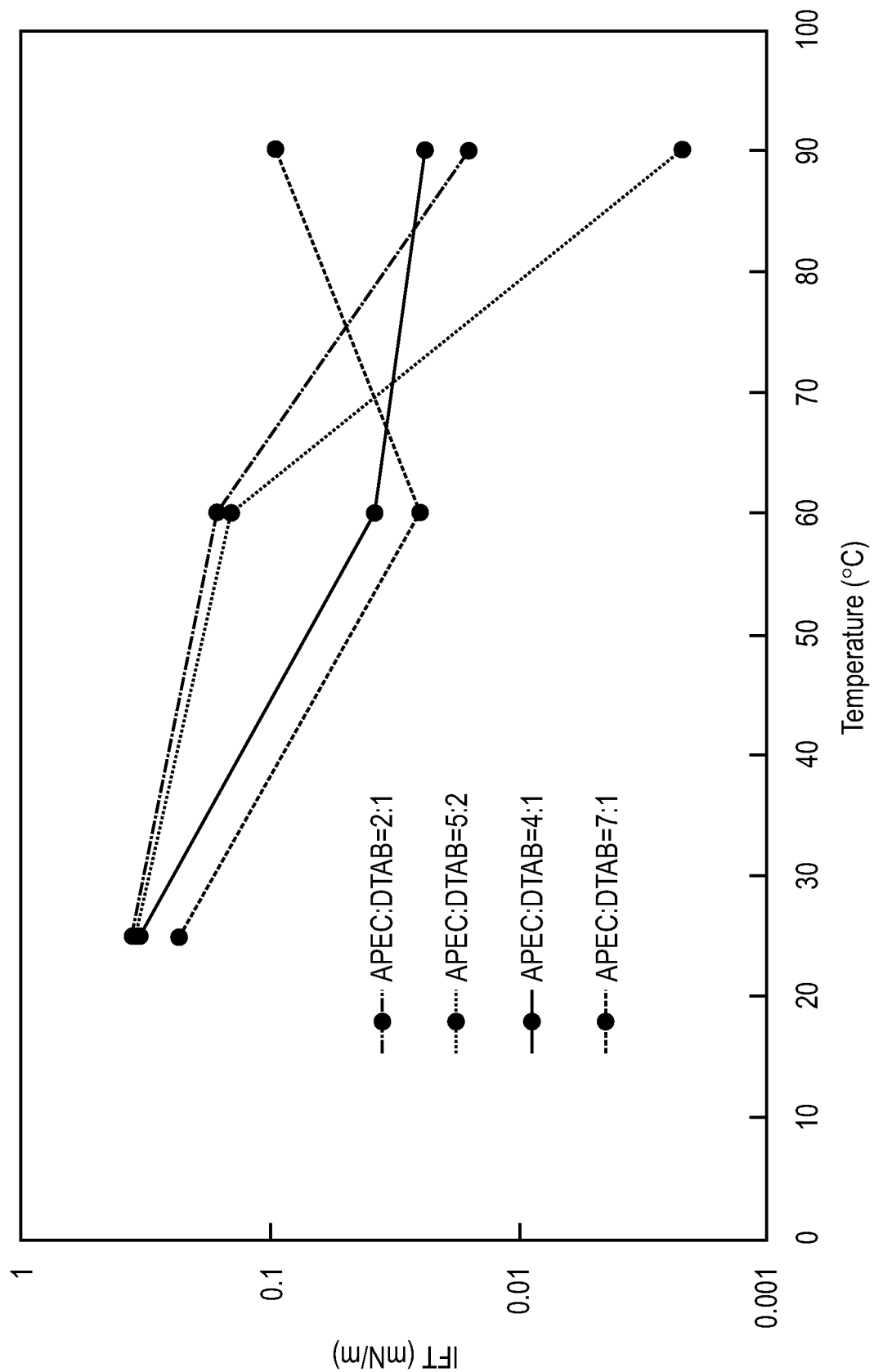

THERMAL STIMULI-RESPONSIVE SURFACTANTS FOR ENHANCED OIL RECOVERY

TECHNICAL FIELD

This disclosure describes surfactant formulations and methods of using the surfactant formulations to reduce interfacial tension between crude oil and injection fluid to enhance oil recovery and to improve treatment of produced fluids.

BACKGROUND

Primary and secondary oil recovery processes usually only remove about one-third of crude oil in reservoirs due to oil trapped in capillaries or because of an unfavorable mobility ratio between the aqueous and oleic phases. Enhanced oil recovery (EOR) techniques, such as chemical EOR, can be used to increase oil production and oil recovery efficiency. Chemical EOR involves adding a chemical agent in order to enhance the efficiency of microscopic and macroscopic displacement to increase recovery of the oil. The displacement efficiency can be improved by altering the mobility ratio of water and oil or reducing the interfacial tension (IFT) between immiscible phases.

In chemical flooding, surfactants are widely used in displacing fluids in order to increase the oil recovery for mature fields. The main function of a surfactant is to reduce IFT between crude oil and injected fluids, which leads to an increase in the capillary number, indicating high oil production potential. However, due to the subsequent presence of the surfactants in the produced fluids, stable emulsions typically exist in the produced fluids, which prove challenging to demulsify and separate into oil and water.

Accordingly, there is a need for methods for treating injection fluids to enhance oil recovery that will not interfere with treatment of the produced fluids.

SUMMARY

Provided in the present disclosure is a method of recovering oil from a subterranean formation. In some embodiments, the method includes providing an aqueous solution containing a thermal stimuli-responsive surfactant mixture into a reservoir of the subterranean formation containing oil, where the thermal stimuli-responsive surfactant mixture contains an anionic surfactant and a cationic surfactant, where at least one of the anionic surfactant or cationic surfactant is substituted with one or more nonionic groups; contacting the aqueous solution with the oil in the reservoir; and producing a fluid from the reservoir containing the aqueous solution and the oil. In some embodiments of the method, the thermal stimuli-responsive surfactant mixture reduces the interfacial tension between the aqueous solution and the oil in the reservoir to about $10^{-2}$ mN/m or lower at temperatures of about 60° C. to about 200° C.; and the interfacial tension between the aqueous solution containing the thermal stimuli-responsive surfactant mixture and the oil in the produced fluid increases to about 0.1 mN/m or higher at temperatures of about 20° C. to about 50° C.

In some embodiments of the method, the aqueous solution contains seawater, produced water, tap water, distilled water, deionized water, brine, or any combination thereof.

In some embodiments of the method, the anionic surfactant is selected from the group consisting of sodium alkylphenol ethoxylate carboxylate (APEC), sodium alkyl ethoxylate carboxylate (AEC), sodium alkylphenol ethoxylate sulfate (APES), sodium alkyl ethoxylate sulfate (AES), sodium alkylphenol propoxylate carboxylate, sodium alkyl propoxylate carboxylate, sodium alkylphenol propoxylate sulfate, and sodium alkyl propoxylate sulfate. In some embodiments, the anionic surfactant is APEC.

In some embodiments of the method, the cationic surfactant is selected from the group consisting of dodecyltrimethylammonium bromide (DTAB), dodecyltrimethylammonium chloride (DTAC), tetradecyltrimethylammonium bromide (TTAB), tetradecyltrimethylammonium chloride (TTAC), cetyltrimethylammonium bromide (CTAB), and cetyltrimethylammonium chloride (CTAC). In some embodiments, the cationic surfactant is DTAB.

In some embodiments of the method, the surfactant mixture contains an anionic surfactant that is APEC and a cationic surfactant that is DTAB.

In some embodiments of the method, the ratio of anionic surfactant to cationic surfactant is between 2:1 and 7:1.

In some embodiments of the method, the aqueous solution contains about 0.01 wt % to about 1 wt % surfactant mixture. In some embodiments, the aqueous solution contains about 0.2 wt % surfactant mixture.

In some embodiments of the method, the reservoir temperature is about 60° C. to about 150° C. In some embodiments, the reservoir temperature is about 60° C. to about 120° C. In some embodiments, the reservoir temperature is about 60° C. to about 90° C.

In some embodiments of the method, the interfacial tension between the aqueous solution and oil in the reservoir is about $10^{-3}$ mN/m or lower. In some embodiments, the interfacial tension between the aqueous solution and oil produced in the field is about 0.1 mN/m or higher.

In some embodiments, the method further includes separating the oil from the aqueous solution in the produced fluid.

Also provided in the present disclosure is an aqueous solution that contains about 0.01 wt % to about 1 wt % of a thermal stimuli-responsive surfactant mixture, the surfactant mixture containing an anionic surfactant selected from the group consisting of alkylphenol ethoxylate carboxylate (APEC), sodium alkyl ethoxylate carboxylate (AEC), sodium alkylphenol ethoxylate sulfate (APES) and sodium alkyl ethoxylate sulfate (AES); and a cationic surfactant selected from the group consisting of dodecyltrimethylammonium bromide (DTAB), dodecyltrimethylammonium chloride (DTAC), tetradecyltrimethylammonium bromide (TTAB), tetradecyltrimethylammonium chloride (TTAC), cetyltrimethylammonium bromide (CTAB), and cetyltrimethylammonium chloride (CTAC); where at least one of the anionic surfactant or cationic surfactant is substituted with one or more nonionic groups; and water.

In some embodiments, the aqueous solution contains about 0.2% of the thermal stimuli-responsive surfactant mixture.

In some embodiments, the ratio of anionic surfactant to cationic surfactant is between 2:1 and 7:1.

In some embodiments of the aqueous solution, the water is selected from seawater, produced water, tap water, distilled water, deionized water, brine, or any combination thereof.

In some embodiments, the aqueous solution is used in the recovery of oil from a subterranean formation. In some embodiments, the aqueous solution reduces interfacial tension between the aqueous solution and the oil in a reservoir of a subterranean formation to about $10^{-2}$ mN/m or lower at temperatures of about 60° C. to about 200° C. and increases interfacial tension between the aqueous solution and the oil in a reservoir of a subterranean formation to about 0.1 mN/m or higher at temperatures of about 20° C. to about 50° C.

Also provided is a method of enhanced oil recovery, the method including introducing the aqueous solution of the present disclosure into a subterranean oil formation; and recovering a hydrocarbon from the subterranean oil formation.

DESCRIPTION OF DRAWINGS

FIG. 1 is a graph showing the interfacial tension (IFT) between crude oil and exemplary surfactant mixtures containing an anionic surfactant and a cationic surfactant in seawater at 25° C., 60° C., and 90° C.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

As used herein, the term "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways. A subterranean formation can include oil and gas wells, as well as other cement constructions, such as buildings, bunkers, storage, underground architectures, semi-subterranean structures, tunnels, caves, mines, to avoid and mitigate leaks, loss of structural integrity, and fluid migrations.

As used herein, the term "surfactant" means a compound having at least one hydrophilic portion and at least one hydrophobic portion, where the compound is capable of spontaneous self-aggregation in aqueous compositions. The term "thermal stimuli-responsive" refers to a surfactant or surfactant mixture that changes its interfacial properties in response to changes in temperature. For example, the surfactant mixtures of the present disclosure have high oil/water IFT values at lower temperatures and low or ultra-low oil/water IFT values at higher temperatures.

As used herein, the term "cationic surfactant" means a surfactant having one or more cationic moieties covalently bonded to the molecule and a net molecular charge that is positive.

As used herein, the term "anionic surfactant" means a surfactant having one or more anionic moieties covalently bonded to the molecule and a net molecular charge that is negative.

As used herein, the term "nonionic group" refers to a moiety that has no charge that is covalently bonded to a molecule. In some embodiments, the nonionic group is bonded to an anionic surfactant to form a nonionic-anionic surfactant. In some embodiments, the nonionic group is bonded to a cationic surfactant to form a nonionic-cationic surfactant.

As used herein, "interfacial tension" refers to a measurement of the surface energy present at an interface between two liquid phases that exhibit a phase boundary, such as an aqueous phase and a hydrocarbon phase. A high interfacial tension value can be indicative of the inability of one fluid to mix with a second fluid to form an emulsion, while a low interfacial tension value can be indicative of the ability of one fluid to mix with a second fluid to form an emulsion. Interfacial tension may be measured at a known or fixed temperature and pressure using any number of techniques and systems know in the art, including, for example, spinning drop tensiometers, pendent drop techniques, and the like.

As used herein, "ultra-low interfacial tension" refers to an IFT value of about $10^{-3}$ mN/m or less.

As used herein, "high interfacial tension" refers to an IFT value of about $10^{-1}$ mN/m or greater.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Surfactant Mixtures

The present disclosure provides thermal stimuli-responsive surfactant mixtures composed of anionic surfactants and cationic surfactants in which at least one of the anionic or cationic surfactants contains, or is substituted with, nonionic groups. The surfactant mixtures of the present disclosure possess unique interfacial properties: high oil/water interfacial tension (IFT) at low temperatures and ultra-low oil/water IFT at high temperatures. The surfactant mixtures are useful in oil and gas recovery applications that typically involve high temperatures in the reservoirs, in which a low IFT is desired, and lower temperatures for the treatment of the produced fluids, in which a higher IFT is desired. Because demulsification of produced fluids in chemical flooding is a challenge due to the presence of stable emulsions in the injected surfactants, such thermal stimuli-responsive surfactant mixtures are beneficial for improving oil recovery in high temperature reservoirs and the treating the produced fluids at ambient temperatures. Without wishing to be bound by any particular theory, the thermal stimuli-responsiveness comes from the nonionic groups of the anionic-nonionic or cationic-nonionic surfactant, leading to better synergism between the oppositely charged surfactants at high temperatures. The surfactant mixtures of the present disclosure thus show significant potential in oil recovery applications of high temperature reservoirs due to the ultra-low IFT and produced fluids treatment due to poor emulsification ability at low temperatures.

The surfactant mixtures of the present disclosure contain an anionic surfactant. In some embodiments, the anionic surfactant is a sulfonate surfactant having a hydrophilic sulfonate head-group and a hydrophobic tail-group. In some embodiments, the anionic surfactant is a carboxylate surfactant having a carboxylate head-group and a hydrophobic tail group. In some embodiments, the anionic surfactant is substituted by one or more nonionic groups. Examples of nonionic groups include, but are not limited to, ethoxy groups, propoxy groups, and combinations thereof. In some embodiments, the anionic surfactant is substituted with between 2 and 30 ethoxy groups, propoxy groups, or a combination thereof, such as between 2 and 25, between 2 and 20, between 2 and 15, between 2 and 10, between 2 and 5, between 5 and 30, between 5 and 25, between 5 and 20, between 5 and 15, between 5 and 10, between 10 and 30, between 10 and 25, between 10 and 20, between 10 and 15, between 15 and 30, between 15 and 25, between 15 and 20, between 20 and 30, between 20 and 25, between 25 and 30, or 2, 3, 4, 5, 6, 7, 8, 9, 10, 11, 12, 13, 14, 15, 16, 17, 18, 19, 20, 21, 22, 23, 24, 25, 26, 27, 28, 29, or 30 ethoxy groups, propoxy groups, or a combination thereof. In some embodiments, the anionic surfactant is an alkyl ethoxylate, alkyl propoxylate, or alkyl ethoxylate propoxylate surfactant. In some embodiments, the anionic surfactant is an alkyl ethoxylate surfactant. In some embodiments, the anionic surfactant is an alkyl propoxylate surfactant. In some embodiments, the anionic surfactant is an alkyl ethoxylate propoxylate surfactant. In some embodiments, the anionic surfactant is selected from the group consisting of sodium alkylphenol ethoxylate carboxylate (APEC), sodium alkyl ethoxylate carboxylate (AEC), sodium alkylphenol ethoxylate sulfate (APES), sodium alkyl ethoxylate sulfate (AES), sodium alkylphenol propoxylate carboxylate, sodium alkyl propoxylate carboxylate, sodium alkylphenol propoxylate sulfate, and sodium alkyl propoxylate sulfate. In some embodiments, the anionic surfactant is APEC. In some embodiments, the anionic surfactant is AEC. In some embodiments, the anionic surfactant is APES. In some embodiments, the anionic surfactant is AES.

The surfactant mixtures of the present disclosure contain a cationic surfactant. In some embodiments, the cationic surfactant is a quaternary ammonium salt. In some embodiments, the cationic surfactant is selected from the group consisting of dodecyltrimethylammonium bromide (DTAB), dodecyltrimethylammonium chloride (DTAC), tetradecyltrimethylammonium bromide (TTAB), tetradecyltrimethylammonium chloride (TTAC), cetyltrimethylammonium bromide (CTAB), and cetyltrimethylammonium chloride (CTAC). In some embodiments, the cationic surfactant is DTAB. In some embodiments, the cationic surfactant is DTAC. In some embodiments, the cationic surfactant is TTAB. In some embodiments, the cationic surfactant is TTAC. In some embodiments, the cationic surfactant is CTAB. In some embodiments, the cationic surfactant is CTAC.

In some embodiments, the cationic surfactant is substituted by one or more nonionic groups. Examples of nonionic groups include, but are not limited to, ethoxy groups, propoxy groups, and combinations thereof. In some embodiments, the cationic surfactant is substituted with between 2 and 30 ethoxy groups, propoxy groups, or a combination thereof, such as between 2 and 25, between 2 and 20, between 2 and 15, between 2 and 10, between 2 and 5, between 5 and 30, between 5 and 25, between 5 and 20, between 5 and 15, between 5 and 10, between 10 and 30, between 10 and 25, between 10 and 20, between 10 and 15, between 15 and 30, between 15 and 25, between 15 and 20, between 20 and 30, between 20 and 25, between 25 and 30, or 2, 3, 4, 5, 6, 7, 8, 9, 10, 11, 12, 13, 14, 15, 16, 17, 18, 19, 20, 21, 22, 23, 24, 25, 26, 27, 28, 29, or 30 ethoxy groups, propoxy groups, or a combination thereof.

In some embodiments of the surfactant mixture, the anionic surfactant is APEC and the cationic surfactant is DTAB.

Thus, in some embodiments, the surfactant mixture contains an anionic-nonionic surfactant (i.e., an anionic surfactant substituted with one or more nonionic groups) and a cationic surfactant. In some embodiments, the surfactant mixture contains an anionic surfactant and a cationic-nonionic surfactant (i.e., a cationic surfactant substituted with one or more nonionic groups).

In the surfactant mixtures of the present disclosure, the ratio of anionic surfactant to cationic surfactant is important in order to achieve low oil/water IFT at high temperatures and high oil/water IFT at low or ambient temperatures. In some embodiments, the ratio of anionic surfactant to cationic surfactant is between 1:1 and 10:1, such as between 1:1 and 9:1, 1:1 and 8:1, 1:1 and 7:1, 1:1 and 6:1, 1:1 and 5:1, 1:1 and 4:1, 1:1 and 3:1, 1:1 and 2.5:1, 1:1 and 2:1, 2:1 and 10:1, 2:1 and 9:1, 2:1 and 8:1, 2:1 and 7:1, 2:1 and 6:1, 2:1 and 5:1, 2:1 and 4:1, 2:1 and 3:1, 2:1 and 2.5:1, 2.5:1 and 10:1, 2.5:1 and 9:1, 2.5:1 and 8:1, 2.5:1 and 7:1, 2.5:1 and 6:1, 2.5:1 and 5:1, 2.5:1 and 4:1, 2.5:1 and 3:1, 3:1 and 10:1, 3:1 and 9:1, 3:1 and 8:1, 3:1 and 7:1, 3:1 and 6:1, 3:1 and 5:1, 3:1 and 4:1, 4:1 and 10:1, 4:1 and 9:1, 4:1 and 8:1, 4:1 and 7:1, 4:1 and 6:1, 4:1 and 5:1, 5:1 and 10:1, 5:1 and 9:1, 5:1 and 8:1, 5:1 and 7:1, 5:1 and 6:1, 6:1 and 10:1, 6:1 and 9:1, 6:1 and 8:1, 6:1 and 7:1, 7:1 and 10:1, 7:1 and 9:1, 7:1 and 8:1, 8:1 and 10:1, 8:1 and 9:1, and 9:1 and 10:1. In some embodiments, the ratio of anionic surfactant to cationic surfactant is between 2:1 and 7:1. In some embodiments, the ratio of anionic surfactant to cationic surfactant is between 2:1 and 4:1. In some embodiments, the ratio of anionic surfactant to cationic surfactant is 2:1. In some embodiments, the ratio of anionic surfactant to cationic surfactant is 5:2. In some embodiments, the ratio of anionic surfactant to cationic surfactant is 4:1. In some embodiments, the ratio of anionic surfactant to cationic surfactant is 7:1. In some embodiments of the surfactant mixture, the anionic surfactant is APEC and the cationic surfactant is DTAB.

Aqueous Solutions

Provided in the present disclosure are aqueous solutions that contain the surfactant mixtures described herein. Thus, provided in the present disclosure are aqueous solutions that contain a thermal stimuli-responsive surfactant mixture that contains an anionic surfactant and a cationic surfactant, wherein at least one of the anionic surfactant or cationic surfactant is substituted with one or more nonionic groups. In some embodiments, at least one of the anionic surfactant or cationic surfactant is substituted with one or more nonionic groups selected from ethoxy groups, propoxy groups, or combinations thereof.

The aqueous solutions of the present disclosure contain water, in addition to the surfactant mixture. The water can be fresh water, tap water, hard water, well water, deionized water, distilled water, produced water, municipal water, waste water such as runoff water, "gray" water, or municipal waste water, treated or partially treated waste water, brackish water, brine, hard brine, seawater, or a combination thereof. In embodiments, a water source includes one or more salts, ions, buffers, acids, bases, surfactants, or other dissolved, dispersed, or emulsified compounds, materials, components, or combinations thereof. The term "produced water" refers to water that is present within and/or flows from a subterranean reservoir. In some embodiments, the water is seawater, produced water, tap water, distilled water, deionized water, brine, or any combination thereof. In some embodiments, the water is seawater. In some embodiments, the water is brine. In some embodiments, the brine is selected from ammonium chloride, potassium chloride, sodium chloride, sodium formate, potassium chloride, potassium formate, sodium bromide, calcium chloride, calcium bromide, and mixtures thereof. In some embodiments, the aqueous solution contains brine having a total dissolved solids (TDS) content of about 10,000 ppm or more, such as about 15,000 ppm, about 20,000 ppm, about 25,000 ppm, about 30,000 ppm, about 35,000 ppm, about 40,000 ppm, or more. In some embodiments, the aqueous solution contains brine having a salinity between about 10,000 ppm and about 15,000 ppm. In some embodiments, the aqueous solution contains brine having a salinity of about 14,400 ppm. In some embodiments, the aqueous solution has a total dissolved solids of 57,670 ppm with a hardness of 2760 ppm.

In some embodiments, the aqueous solution contains organic solvents miscible with or dispersible in water. Examples of such solvents include, but are not limited to, alcohols, such as methanol, ethanol, or propanol.

The aqueous solution of the present disclosure contains about 0.01 wt % to about 1 wt % surfactant mixture, such as about 0.05 wt % to about 1 wt %, about 0.05 wt % to about 0.9 wt %, about 0.05 wt % to about 0.8 wt %, about 0.05 wt % to about 0.7 wt %, about 0.05 wt % to about 0.6 wt %, about 0.05 wt % to about 0.5 wt %, about 0.05 wt % to about 0.4 wt %, about 0.05 wt % to about 0.3 wt %, about 0.05 wt % to about 0.2 wt %, about 0.05 wt % to about 0.1 wt %, about 0.1 wt % to about 1 wt %, about 0.1 wt % to about 0.9 wt %, about 0.1 wt % to about 0.8 wt %, about 0.1 wt % to about 0.7 wt %, about 0.1 wt % to about 0.6 wt %, about 0.1 wt % to about 0.5 wt %, about 0.1 wt % to about 0.4 wt %, about 0.1 wt % to about 0.3 wt %, about 0.1 wt % to about 0.2 wt %, about 0.2 wt % to about 1 wt %, about 0.2 wt % to about 0.9 wt %, about 0.2 wt % to about 0.8 wt %, about 0.2 wt % to about 0.7 wt %, about 0.2 wt % to about 0.6 wt %, about 0.2 wt % to about 0.5 wt %, about 0.2 wt % to about 0.4 wt %, about 0.2 wt % to about 0.3 wt %, about 0.3 wt % to about 1 wt %, about 0.3 wt % to about 0.9 wt %, about 0.3 wt % to about 0.8 wt %, about 0.3 wt % to about 0.7 wt %, about 0.3 wt % to about 0.6 wt %, about 0.3 wt % to about 0.5 wt %, about 0.3 wt % to about 0.4 wt %, about 0.4 wt % to about 1 wt %, about 0.4 wt % to about 0.9 wt %, about 0.4 wt % to about 0.8 wt %, about 0.4 wt % to about 0.7 wt %, about 0.4 wt % to about 0.6 wt %, about 0.4 wt % to about 0.5 wt %, about 0.5 wt % to about 1 wt %, about 0.5 wt % to about 0.9 wt %, about 0.5 wt % to about 0.8 wt %, about 0.5 wt % to about 0.7 wt %, about 0.5 wt % to about 0.6 wt %, about 0.6 wt % to about 1 wt %, about 0.6 wt % to about 0.9 wt %, about 0.6 wt % to about 0.8 wt %, about 0.6 wt % to about 0.7 wt %, about 0.7 wt % to about 1 wt %, about 0.7 wt % to about 0.9 wt %, about 0.7 wt % to about 0.8 wt %, about 0.8 wt % to about 1 wt %, about 0.8 wt % to about 0.9 wt %, about 0.9 wt % to about 1 wt %, or about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1.0 wt % surfactant mixture. In some embodiments, the aqueous solution contains about 0.1 wt % to about 0.5 wt % surfactant mixture. In some embodiments, the aqueous solution contains about 0.1 wt % to about 0.3 wt % surfactant mixture. In some embodiments, the aqueous solution contains about 0.2 wt % surfactant mixture.

The surfactant mixtures and aqueous solutions containing the surfactant mixtures of the present disclosure can affect the interfacial tension between oil and water depending on temperature. In some embodiments, the surfactant mixture or aqueous solution containing the surfactant mixture reduces interfacial tension values between the aqueous solution and oil at high temperatures, such as temperatures of about 60° C. or higher and interfacial tension values between the aqueous solution and oil increases at low temperatures, such as at temperatures of about 50° C. or lower. In some embodiments, the surfactant mixture or aqueous solution containing the surfactant mixture reduces interfacial tension values between the aqueous solution and oil to about $10^{-2}$ mN/m or lower at temperatures of about 60° C. to about 200° C. and increases interfacial tension values between the aqueous solution and oil to about 0.1 mN/m or higher at temperatures of about 20° C. to about 50° C. In some embodiments, the surfactant mixture or aqueous solution containing the surfactant mixture reduces interfacial tension values between the aqueous solution and oil to about $10^{-2}$ mN/m or lower at temperatures of about 60° C. to about 150° C. and increases interfacial tension values between the aqueous solution and oil to about 0.1 mN/m or higher at temperatures of about 20° C. to about 50° C.

Methods of Enhanced Oil Recovery

The surfactant mixtures of the present disclosure can be used to enhance or increase oil recovery from a reservoir by lowering the interfacial tension between the injection fluid containing the surfactant mixture and crude oil at high temperatures, such as temperatures of a reservoir. The surfactant mixtures of the present disclosure are thermal stimuli-responsive and thus are also useful in treating produced liquids at low, or ambient, temperatures, such as temperatures used in treating produced fluids, by increasing the IFT such that it is too high to stabilize oil drops in the produced fluids.

Thus, the surfactant mixtures of the present disclosure can be used to reduce interfacial tension between crude oil and injection fluids in order to enhance oil recovery and improve produced fluids treatment. The surfactant mixtures of the present disclosure contain a mixture of anionic and cationic surfactants. In some embodiments, oil recovery is enhanced by about 50% to about 70% as compared to recovery methods that do not include the surfactant mixture of the present disclosure. The surfactant mixtures of the present disclosure can be used to reduce IFT to ultra-low levels between injection fluids and crude oil. In the surfactant mixtures of the present disclosure, at least one of the surfactants in the mixture (for example, one of the anionic or cationic surfactants) contains, or is substituted with, nonionic groups. The surfactant mixtures of the present disclosure are thermal stimuli-responsive. In some embodiments, the surfactant mixtures of the present disclosure exhibit ultra-low IFT at reservoir temperatures and high IFT at low temperatures. Thus, in some embodiments, the surfactant mixture and methods of the present disclosure enhance oil recovery from the reservoir and also are useful in treatment of produced fluids.

In some embodiments, the surfactant mixtures of the present disclosure reduce the IFT between crude oil and a solution containing the surfactant mixture (for example, an aqueous solution containing the surfactant mixture) to about $10^{-3}$ mN/m or lower in high salinity seawater at reservoir temperatures of about 90° C. and increase the IFT to about $10^{-1}$ mN/m or higher at 25° C. and 40° C.

Thus, provided in the present disclosure is a method of recovering oil from a subterranean formation. In some embodiments, the method includes providing an aqueous solution containing a thermal stimuli-responsive surfactant mixture into a reservoir of the subterranean formation containing oil; contacting the aqueous solution with the oil in the reservoir; and producing a fluid from the reservoir that contains the aqueous solution and the oil. In some embodiments, the thermal stimuli-responsive surfactant mixture contains an anionic surfactant and a cationic surfactant, where at least one of the anionic surfactant or cationic surfactant contains (or is substituted with) one or more nonionic groups. In some embodiments, the surfactant mixture or aqueous solution containing the surfactant mixture is as described in the present disclosure. In some embodiments, the surfactant mixture reduces the interfacial tension between the aqueous solution and oil in the reservoir to about $10^{-2}$ mN/m or lower at temperatures of about 60° C. to about 200° C. or about 60° C. to about 150° C. In some embodiments, the surfactant mixture increases the interfacial tension between the aqueous solution and oil in the produced fluid to about 0.1 mN/m or higher at temperatures of about 20° C. to about 50° C.

In some embodiments, the reservoir temperature is about 60° C. or higher, such as about 70° C., about 80° C., about 90° C., about 100° C., about 110° C., about 120° C., or higher. In some embodiments, the reservoir temperature is about 60° C. to about 120° C. In some embodiments, the reservoir temperature is about 60° C. In some embodiments, the reservoir temperature is about 80° C. In some embodiments, the reservoir temperature is about 90° C.

In some embodiments, the produced fluids are treated at temperatures between about 10° C. to about 50° C., such as about 10° C., about 15° C., about 20° C., about 25° C., about 30° C., about 40° C., or about 50° C. In some embodiments, the produced fluids are treated at ambient temperatures, such as between about 15° C. to about 25° C. In some embodiments, the produced fluids are treated at 25° C. In some embodiments, the produced fluids are treated at 40° C.

In the present disclosure, the surfactant mixtures present ultra-low IFT between crude oil and water, such as high salinity synthetic seawater, at high temperatures (for example, about 90° C.). Such low IFT indicates good potential for improving oil recovery. At low temperature, for example, about 25° C., the IFT is too high to stabilize oil drops and is beneficial for produced fluids treatment.

In some embodiments of the methods of the present disclosure, the surfactant mixture provides an ultra-low IFT between water and oil, such as in a reservoir, at high temperatures, such as an IFT of about $10^{-2}$ mN/m or lower, or about $10^{-3}$ mN/m, about 10-+mN/m, or about $10^{-5}$ mN/m or lower at temperatures of about 60° C. or higher, such as about 70° C., about 80° C., about 90° C., about 100° C., about 110° C., about 120° C., or higher.

In some embodiments of the methods of the present disclosure, the surfactant mixture provides an IFT between water and oil in produced fluids at low or ambient temperatures, such as an IFT of about 0.15 mN/m or higher, or about 0.1 mN/m, 0.15 mN/m, 0.2 mN/m, 0.25 mN/m, 0.3 mN/m, 0.35 mN/m, 0.4 mN/m, 0.45 mN/m, or higher, at temperatures of about 10° C. to about 50° C., such as about 10° C., about 15° C., about 20° C., about 25° C., about 30° C., about 40° C., or about 50° C.

Also provided in the present disclosure are methods of enhanced oil recovery. In some embodiments, the method includes introducing the surfactant mixture or aqueous solution containing the surfactant mixture of the present disclosure into a subterranean oil formation; and recovering a hydrocarbon from the subterranean oil formation.

The surfactant mixture of the present disclosure can be used in any application, including surface or near-surface treatments, downhole, or for enhanced oil recovery, that involves high temperature conditions and lower or ambient temperature conditions, such as environmental clean-up of ground water contaminated by oils or other surfactant-based applications.

Examples

Surfactant mixtures containing various ratios of an anionic surfactant and a cationic surfactant were prepared and tested in seawater and brine at different temperatures to determine the interfacial tension (IFT) between the mixtures and crude oil.

Mixtures containing the anionic surfactant sodium alkylphenyl ethoxylate carboxylate (APEC) and the cationic surfactant dodecyltrimethylammonium bromide (DTAB) were prepared at ratios of 2:1, 5:2, 4:1, and 7:1 for APEC: DTAB by stirring the desired amounts of anionic surfactant and cationic surfactant with brine. The surfactant mixtures (0.2% APEC/DTAB) were added to seawater or brine with salinity of 14400 ppm. The seawater was a synthetic seawater with total dissolved solids of 57,670 ppm with a hardness of 2760 ppm. The brine was prepared by diluting seawater using deionized water.

The IFT between the surfactant mixtures in seawater and brine and crude oil were tested by spinning drop tensiometer at different temperatures. An oil drop was injected in the test tube containing the surfactant solution. The rotation speed used was 5000 rpm. The Vonnegut formula was used to calculate IFT when the ratio of the drop length to the drop diameter was larger than 4.0, otherwise the Laplace-Young formula was used. The crude oil was Saudi Arabian light oil that contained 40.57% saturates, 51.39% aromatics, 5.55% resins, 2.09% asphaltenes, and 0.13% acid number (mg KOH/g oil), and had a density of 0.8153 g/cm3 at 100° C. and viscosity of 0.69 cP at 100° C. FIG. 1 shows the IFT between the crude oil and each of the mixtures in seawater at 25° C., 60° C., and 90° C., and the results are shown in Table 1.

TABLE 1

IFT of 0.2% APEC:DTAB at different mixing ratios and temperatures in seawater.

| Surfactant mixture | APEC:DTAB (2:1) | APEC:DTAB (5:2) | APEC:DTAB (4:1) | APEC:DTAB (7:1) |
|---|---|---|---|---|
| 25° C. | 0.36 | 0.35 | 0.34 | 0.23 |
| 60° C. | 0.164 | 0.144 | 0.038 | 0.025 |
| 90° C. | 0.016 | 0.0022 | 0.024 | 0.095 |

The results of the tests in seawater of the 5:2 APEC:DTAB mixture at various temperatures are shown in Table 2. The IFT of APEC and DTAB in seawater at 25° C. is 0.19 mN/m and 1.25 mN/m, respectively, and the IFT of APEC and DTAB in seawater at 90° C. is 0.20 mN/m and 2.94 mN/m, respectively. The results of the tests in brine with a salinity of 14400 ppm of the 4:1 APEC:DTAB mixture at various temperatures are shown in Table 3.

TABLE 2

IFT data of crude oil and 0.2% APEC:DTAB (5:2) in seawater at different temperatures.

| Temperature (° C.) | IFT (mN/m) |
|---|---|
| 25 | 0.35 |
| 40 | 0.25 |
| 60 | 0.14 |
| 80 | 0.048 |
| 90 | $2.2 \times 10^{-3}$ |

TABLE 3

IFT data of crude oil and 0.2% APEC:DTAB (4:1) in brine with salinity of 14400 ppm at different temperatures.

| Temperature (° C.) | IFT (mN/m) |
|---|---|
| 25 | 0.17 |
| 40 | 0.10 |
| 60 | 0.050 |
| 80 | $1.4 \times 10^{-3}$ |
| 90 | $6.5 \times 10^{-3}$ |

The seawater was not compatible with APEC alone at 90° C. Two layers were observed and the solution turned hazy after shaking due to the cloud point of APEC, demonstrating that APEC alone is not applicable for high temperature reservoirs. By mixing with DTAB, the compatibility improved and the solution became homogeneous and opalescent.

As can be seen in FIG. 1, the IFT between crude oil and 0.2% APEC:DTAB in seawater at mixing ratios from 2:1 to 4:1 decreased with an increase in temperature from 25° C. to 90° C. The IFT of crude oil and APEC:DTAB with a larger mixing ratio of 7:1 first decreased and then increased with the increase of temperature, showing that the mixing ratio is important to achieve low IFT at high temperatures and high IFT at low temperatures.

The difference of IFTs at 25° C. and 90° C. was largest when the APEC:DTAB ratio was 5:2. The IFT between 0.2% APEC:DTAB (mass ratio of 5:2) and crude oil was $2.2 \times 10^{-3}$ mN/m in seawater at 90° C. This was much lower than the IFT of APEC and DTAB of 0.2 mN/m and 3 mN/m, respectively. Table 1 shows that the IFT increased with the decrease of temperature. The IFT increased to 0.14 mN/m at 60° C. and further increased to 0.35 mN/m at 25° C. This indicates that the surfactant formulation is suitable for reservoirs with temperatures higher than 80° C. and produced fluids treatment below 60° C.

The IFT between 0.2% APEC:DTAB (mass ratio of 4:1) and crude oil was $1.4 \times 10^{-3}$ and $6.5 \times 10^{-3}$ mN/m in brine with salinity of 14400 ppm at 80° C. and 90° C., respectively. Table 2 shows that IFT increased to 0.1 mN/m when temperature decreased to at 40° C. and further increased to 0.17 mN/m at 25° C. This indicates that the surfactant formulation is suitable for reservoirs with temperatures higher than 80° C. and produced fluids treatment below 40° C.

What is claimed is:

1. A method of recovering oil from a subterranean formation, comprising:
    providing an aqueous solution comprising a thermal stimuli-responsive surfactant mixture into a reservoir of the subterranean formation containing oil, wherein the thermal stimuli-responsive surfactant mixture comprises an anionic surfactant and a cationic surfactant, wherein at least one of the anionic surfactant or cationic surfactant comprises one or more nonionic groups;
    contacting the aqueous solution with the oil in the reservoir; and
    producing a fluid from the reservoir comprising the aqueous solution and the oil;
    wherein:
    the thermal stimuli-responsive surfactant mixture reduces the interfacial tension between the aqueous solution and the oil in the reservoir to about $10^{-2}$ mN/m or lower at temperatures of about 60° C. to about 200° C.; and
    the interfacial tension between the aqueous solution containing the thermal stimuli-responsive surfactant mixture and the oil in the produced fluid increases to about 0.1 mN/m or higher at temperatures of about 20° C. to about 50° C.

2. The method of claim 1, wherein the aqueous solution comprises seawater, produced water, tap water, distilled water, deionized water, brine, or any combination thereof.

3. The method of claim 1, wherein the anionic surfactant is selected from the group consisting of sodium alkylphenol ethoxylate carboxylate (APEC), sodium alkyl ethoxylate carboxylate (AEC), sodium alkylphenol ethoxylate sulfate (APES), sodium alkyl ethoxylate sulfate (AES), sodium alkylphenol propoxylate carboxylate, sodium alkyl propoxylate carboxylate, sodium alkylphenol propoxylate sulfate, and sodium alkyl propoxylate sulfate.

4. The method of claim 1, wherein the anionic surfactant is APEC.

5. The method of claim 1, wherein the cationic surfactant is selected from the group consisting of dodecyltrimethylammonium bromide (DTAB), dodecyltrimethylammonium chloride (DTAC), tetradecyltrimethylammonium bromide (TTAB), tetradecyltrimethylammonium chloride (TTAC), cetyltrimethylammonium bromide (CTAB), and cetyltrimethylammonium chloride (CTAC).

6. The method of claim 1, wherein the cationic surfactant is DTAB.

7. The method of claim 1, wherein the surfactant mixture comprises an anionic surfactant that is APEC and a cationic surfactant that is DTAB.

8. The method of claim 1, wherein the ratio of anionic surfactant to cationic surfactant is between 2:1 and 7:1.

9. The method of claim 1, wherein the aqueous solution comprises about 0.01 wt % to about 1 wt % surfactant mixture.

10. The method of claim 1, wherein the aqueous solution comprises about 0.2 wt % surfactant mixture.

11. The method of claim 1, wherein the reservoir temperature is about 60° C. to about 120° C.

12. The method of claim 1, wherein the reservoir temperature is about 60° C. to about 90° C.

13. The method of claim 1, wherein the interfacial tension between the aqueous solution and oil in the reservoir is about $10^{-3}$ mN/m or lower.

14. The method of claim 1, wherein the interfacial tension between the aqueous solution and oil produced in the field is about 0.1 mN/m or higher.

15. The method of claim 1, further comprising separating the oil from the aqueous solution in the produced fluid.

* * * * *